US011600946B2

(12) United States Patent
Gates

(10) Patent No.: US 11,600,946 B2
(45) Date of Patent: Mar. 7, 2023

(54) HEAVY DUTY COAXIAL CABLE CONNECTOR ASSEMBLY SYSTEMS AND METHODS WITH MOUNTING SHELL GROUND ISOLATION

(71) Applicant: EATON INTELLIGENT POWER LIMITED, Dublin (IE)

(72) Inventor: Joshua Paul Gates, Kinston, NC (US)

(73) Assignee: Eaton Intelligent Power Limited, Dublin (IE)

(*) Notice: Subject to any disclaimer, the term of this patent is extended or adjusted under 35 U.S.C. 154(b) by 103 days.

(21) Appl. No.: 17/063,935

(22) Filed: Oct. 6, 2020

(65) Prior Publication Data

US 2021/0104839 A1    Apr. 8, 2021

Related U.S. Application Data

(60) Provisional application No. 62/911,814, filed on Oct. 7, 2019.

(51) Int. Cl.
| | | |
|---|---|---|
| H01R 24/40 | (2011.01) | |
| H01R 13/621 | (2006.01) | |
| H01R 24/38 | (2011.01) | |
| H01R 103/00 | (2006.01) | |

(52) U.S. Cl.
CPC ......... H01R 13/6215 (2013.01); H01R 24/38 (2013.01); H01R 2103/00 (2013.01)

(58) Field of Classification Search
CPC ............. H01R 13/6215; H01R 24/38; H01R 2103/00; H01R 24/52; H01R 13/748; H01R 13/533; F16B 5/02; F16B 43/001; F16B 2200/506
See application file for complete search history.

(56) References Cited

U.S. PATENT DOCUMENTS

| | | | | |
|---|---|---|---|---|
| 3,566,334 A | * | 2/1971 | Ziegler, Jr. ............. | H01R 24/52 439/248 |
| 5,055,069 A | * | 10/1991 | Townsend .......... | H01R 13/6585 439/607.11 |
| 5,261,829 A | * | 11/1993 | Fusselman ......... | H01R 13/6585 439/607.06 |

(Continued)

FOREIGN PATENT DOCUMENTS

| | | |
|---|---|---|
| CN | 207896373 U | 9/2018 |
| EP | 3163690 A1 | 5/2017 |

OTHER PUBLICATIONS

Roughneck The ultimate performance solution, Brochure, Jun. 2019, Publication No. 5121-0619, Eaton, USA.

(Continued)

*Primary Examiner* — Abdullah A Riyami
*Assistant Examiner* — Nelson R. Burgos-Guntin
(74) *Attorney, Agent, or Firm* — Baker Botts L.L.P.

(57) ABSTRACT

A heavy-duty, harsh environment coaxial connector assembly includes a mounting shell connector including a cylindrical body and an electrically conductive mounting flange extending from the cylindrical body, a plurality of mounting apertures formed in the flange to support the mounting shell connector via a plurality of fasteners extending through the respective mounting apertures, and wherein each of the plurality of fasteners is electrically isolated from the mounting flange.

20 Claims, 7 Drawing Sheets

(56) References Cited

U.S. PATENT DOCUMENTS

| | | | | |
|---|---|---|---|---|
| 6,975,178 | B1* | 12/2005 | Kessler | H01Q 1/242 |
| | | | | 333/262 |
| 9,214,750 | B2* | 12/2015 | Esquivel | H01R 12/78 |
| 10,700,451 | B1* | 6/2020 | Pinol Pedret | F16B 35/005 |
| 10,830,833 | B1* | 11/2020 | Brinkoetter | H01R 9/0527 |
| 11,143,675 | B2* | 10/2021 | Hsieh | G01R 1/06761 |
| 2003/0102876 | A1* | 6/2003 | Butler | G01R 1/06772 |
| | | | | 324/755.02 |
| 2010/0248533 | A1 | 9/2010 | Montena | |
| 2012/0315773 | A1* | 12/2012 | Esquivel | H01R 13/5219 |
| | | | | 439/67 |
| 2013/0029526 | A1* | 1/2013 | Berger | H01R 24/52 |
| | | | | 439/607.41 |
| 2013/0323945 | A1* | 12/2013 | Williams | H01R 13/5208 |
| | | | | 439/77 |
| 2014/0099825 | A1 | 4/2014 | Kwak et al. | |
| 2014/0256176 | A1* | 9/2014 | Esquivel | H01R 13/5208 |
| | | | | 439/492 |
| 2019/0288410 | A1* | 9/2019 | Maroney | H01R 9/0521 |
| 2021/0006003 | A1* | 1/2021 | Zhou | H01R 24/52 |
| 2021/0104839 | A1* | 4/2021 | Gates | H01R 13/748 |
| 2021/0265788 | A1* | 8/2021 | Smith | H01R 13/622 |
| 2021/0265789 | A1* | 8/2021 | Smith | H01R 13/506 |
| 2021/0408711 | A1* | 12/2021 | Burris | H01R 13/622 |

OTHER PUBLICATIONS

Introducing Roughneck connectors, Brochure, Sep. 2018, Publication No. 2017-9-26, Eaton, USA.

Heavy Duty, Environmentally Sealed, Power and Control Connenctors, Brochure, 12-054-4, Amphenol Corporation.

* cited by examiner

HEAVY DUTY COAXIAL CABLE CONNECTOR ASSEMBLY SYSTEMS AND METHODS WITH MOUNTING SHELL GROUND ISOLATION

CROSS REFERENCE TO RELATED APPLICATIONS

This application claims the benefit of U.S. Provisional Application Ser. No. 62/911,814 filed Oct. 7, 2019, the entire disclosure of which is hereby incorporated by reference in its entirety.

BACKGROUND

The field of the invention relates generally to heavy duty, coaxial cable connector assemblies for industrial electrical power systems, and more particularly to a mounting shell assembly for heavy duty, harsh environment coaxial connector assemblies having an isolated electrical ground path.

Conventional heavy duty coaxial cable connector assemblies are known to include a plug coupled to a receptacle each having electrical contacts which are in turn used to interconnect electrical cables in a power system. Certain types of heavy duty coaxial connector assemblies are also specifically configured for use in harsh operating environments, including but not necessarily limited to mines, refineries and petroleum chemical plants, and aerospace applications. Mounting shells are sometimes utilized with such connector assemblies to fix one of the mating connectors to a support such as an electrical panel or chassis which may be electrically grounded. The support or chassis may sometimes be electrically grounded.

While known mounting shells of the type described above are satisfactory in many cases in certain end use applications, they remain disadvantaged in some aspects and improvements are desired.

BRIEF DESCRIPTION OF THE DRAWINGS

Non-limiting and non-exhaustive embodiments are described with reference to the following Figures, wherein like reference numerals refer to like parts throughout the various drawings unless otherwise specified.

DETAILED DESCRIPTION

The mounting shell coaxial connector assemblies disclosed herein provide heavy duty, harsh environment capability with ground path isolation of fasteners used to mount the assembly to a support. Relatively low cost coaxial connector assemblies, systems, and methods having desirable mounting shell features for heavy duty, harsh environment applications are therefore possible, without having to custom design new connector assemblies for certain applications wherein a ground path associated with a fastener in the connector assembly may otherwise be problematic or undesirable. Such applications include, but are not necessarily limited to, variable frequency drive (VFD) motor control applications and other signal or control applications wherein ground paths associated with the fasteners introduce electrical noise concerns and other issues in the control or signal path. Method aspects will be in part apparent and in part explicitly discussed in the following description.

Harsh locations such as mines, refineries, and petroleum chemical plants, may entail explosive and/or corrosive elements and the like in the atmosphere, and/or are subject to temperature cycling, pressure cycling, shock and/or mechanical vibration forces that are typically not present in non-harsh locations wherein similar conditions are not present. In a harsh environment, replacement or spare parts are not readily available and it is costly and laborious to custom design heavy-duty connector assemblies for various end uses or applications.

Figure 1:
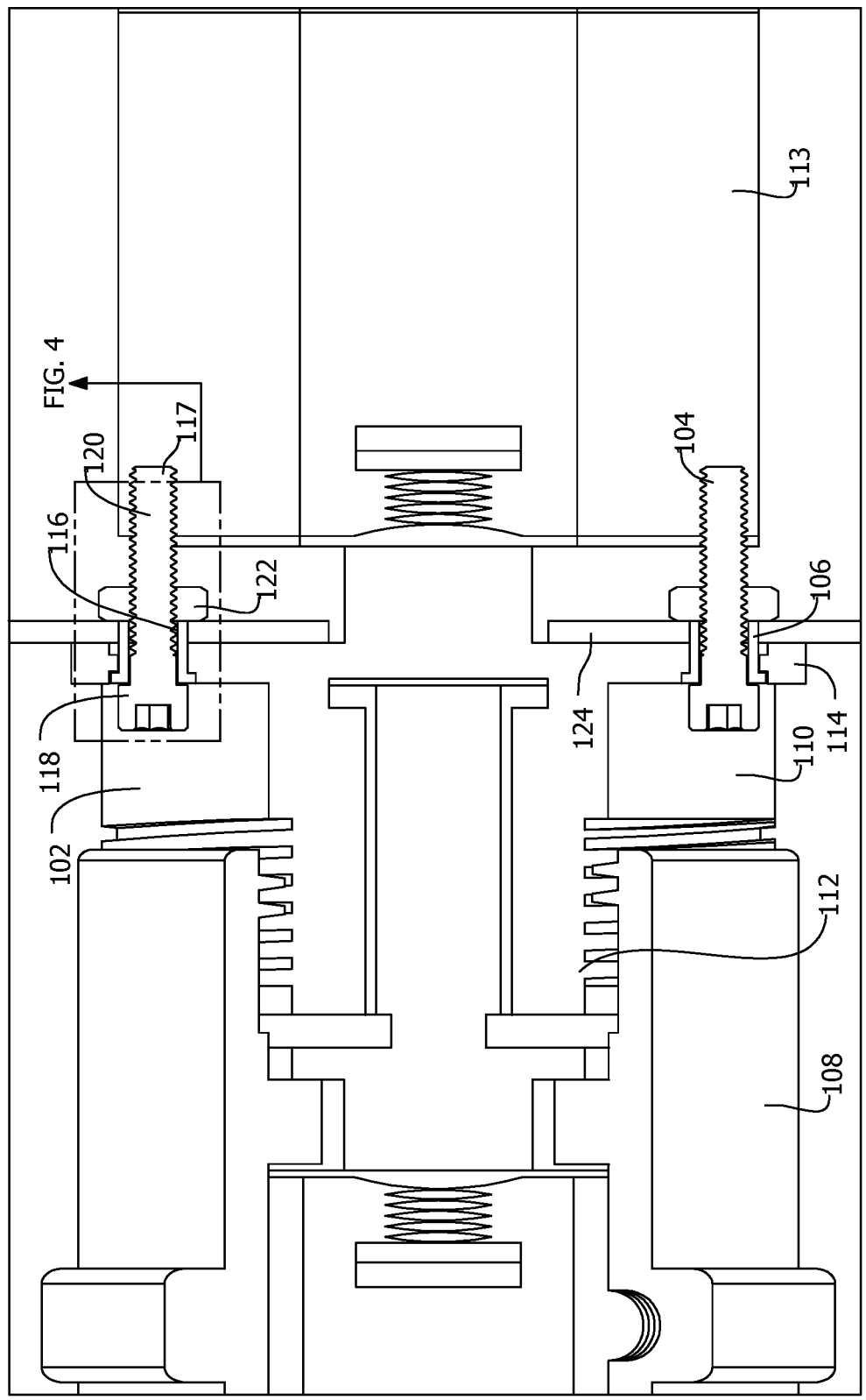
FIG. 1 is a partial side view of an exemplary embodiment of a coaxial connector assembly according to the present invention.
Figure 2:
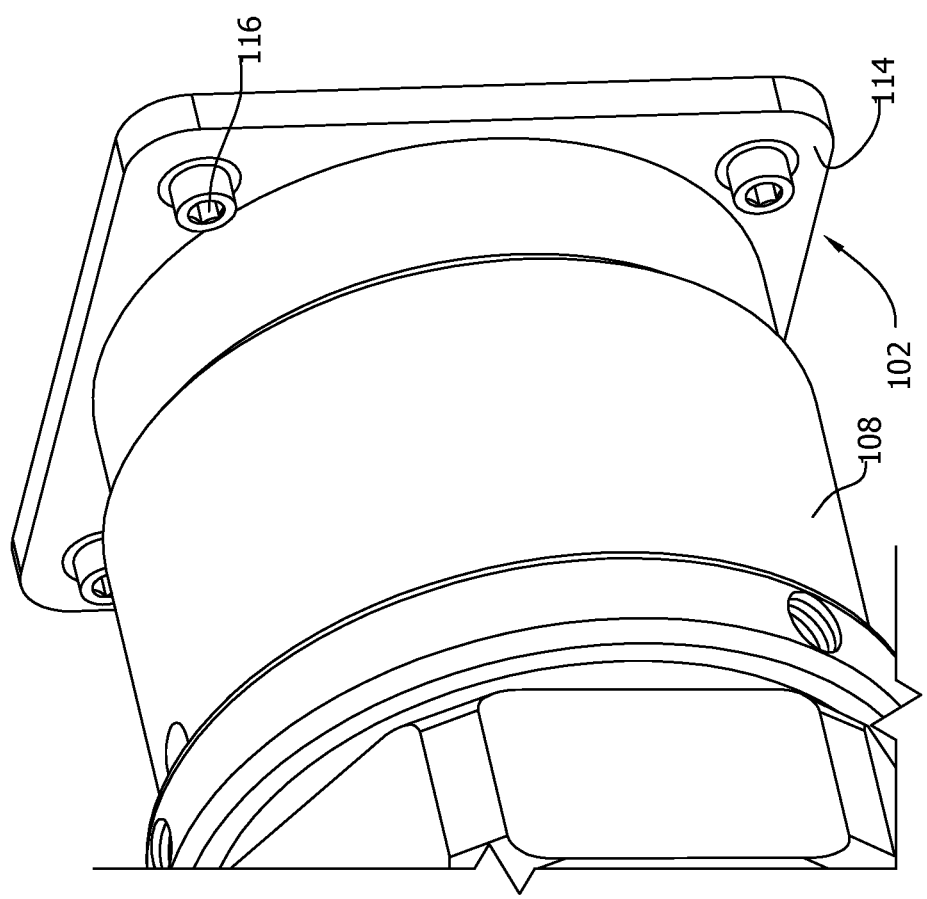
FIG. 2 is a perspective partial view of a first connector coupled to a cable in the exemplary connector assembly shown in FIG. 1.

FIG. 1 is a partial assembly view with portions removed of a heavy duty, harsh environment coaxial connector assembly 100 according to an exemplary embodiment of the present invention. Connector assembly 100 includes a mounting shell 102 configured to establish an interconnection between respective ends of a first cable and a second cable in a supported manner via a plurality of fasteners 104 that are in turn passed through nonconductive bushings 106. FIG. 2 is a front perspective view of the mounting shell 102 coupled to a cable connector 108 that is in turn coupled to an end of a first cable.

In the exemplary embodiment shown, the mounting shell connector 102 includes a first connector portion 110 that is generally cylindrical had has a first outer diameter, and a distal end 112 having a reduced diameter portion with a threaded outer surface. The distal end is 112 mated, via the threaded outer surface with a threaded inner portion of the cable connector 108 that is attached to a first end of a first cable. As shown in FIG. 2 the cable connector 108 may also be formed with a non-round, polygonal gripping surface or other features to assist with an application of torque to tighten the threaded connection to the distal end 112 of the mounting shell connector 102.

A second connector portion 113 is attached to the mounting connector 102 opposite the cable connector 108 via the fasteners 104. A mounting flange 114 is integrally formed in the mounting shell connector 102. The second connector portion 113 extends on one side of the mounting flange 114 (i.e., a rear side of the mounting flange) while the first cable connector 108 extends on the other side of the mounting flange 114 ((i.e., a front side of the mounting flange) in the Figures as shown. The second connector portion 113 is configured to directly or indirectly establish a connection to a second cable via another connector component. A coaxial connection between the ends of the first and second cables, is completed through the assembly 100, and the assembly may complete a multi-pin, single pole connection between the respective cables in secure manner to securely establish and maintain the mechanical and electrical connection in a harsh environment.

In one example, the connector components shown and described are fabricated from rugged and high-strength metal materials such as high tensile strength aluminum that is suited to withstand the demands of the harsh environment wherein they are used. Surfaces of the metal connector components 102, 108, 113 may be anodized for increased resistance to corrosion and wear. In some embodiments, some or all of the connector components 102, 108, 113 (including selected portions only of the connectors 102, 108, 113) may be encapsulated with a non-metallic material. Also, the connector components 102, 108, 113 may be fabricated with resilient elastomeric molded construction. The connector components 102, 108, 113 establish a tough, watertight, corrosion resistant assembly ensuring rugged, dependable service of the connected cables for reliable use in harsh environments.

The mounting flange 114 includes a plurality of apertures 116. In the contemplated embodiment, the perimeter of flange 114 forms a shape of square (FIG. 2), or other shapes such as a polygon, while the cable connector 108 has a cylindrical shape with rounded outer surface. The mounting flange 114 may be fastened to a support via the plurality of mounting apertures.

In the illustrated example, each fastener 104 is a screw 117 having a head 118 and a threaded body 120 that is passed through a busing 106 that is situated to extend through one of the mounting apertures 116 in the mounting flange 114. In contemplated examples, the fasteners 104 may be fabricated from metal, nylon, or other material in various contemplated embodiments. In the case of fasteners 104 being fabricated from an electrically nonconductive material, bushings 106 may in some cases be considered optional while when the fasteners are fabricated from electrically conductive material the bushings 106 are desirable. The connector assembly 100 may include a nut 122 associated with each fastener 104 to provide further mechanical support and stability to the connections established. Fasteners other than screws may be used in other embodiments as long as a part of fastener 104 is sized to pass through aperture 116 and is configured to fasten the mounting flange 114 to a support or panel 124.

In use, to fasten the mounting shell connector 102 to support 124, the mounting shell connector 102 including the mounting flange 114 is located on a first side (i.e., a front side) and a portion of the mounting shell connector 102 may be inserted through an opening in the support 124. When the mounting flange 114 is properly aligned, each fastener 104 is extended through one of the apertures 116 and one of the bushings 106 in the mounting flange 114. The bushings 106 in turn extend through corresponding apertures in the support 124. The nut 122 when tightened clamps the bushing 106 and mounting flange 114 against the back side of the support 124. The nuts 122 and screw heads 118 are therefore disposed on opposite sides of flange 114 and support 124 when mounting is completed.

The bushings 106 are fabricated from an electrically-nonconductive material in a contemplated embodiment. Each nonconductive bushing 106 prevents an electrical connection between the mounting shell connector 102 and support 124 through the conductive fasteners 104, unlike alternative connector assemblies where first connector 102 and support 124 are desirably electrically connected for grounding purposes.

Figure 3A:
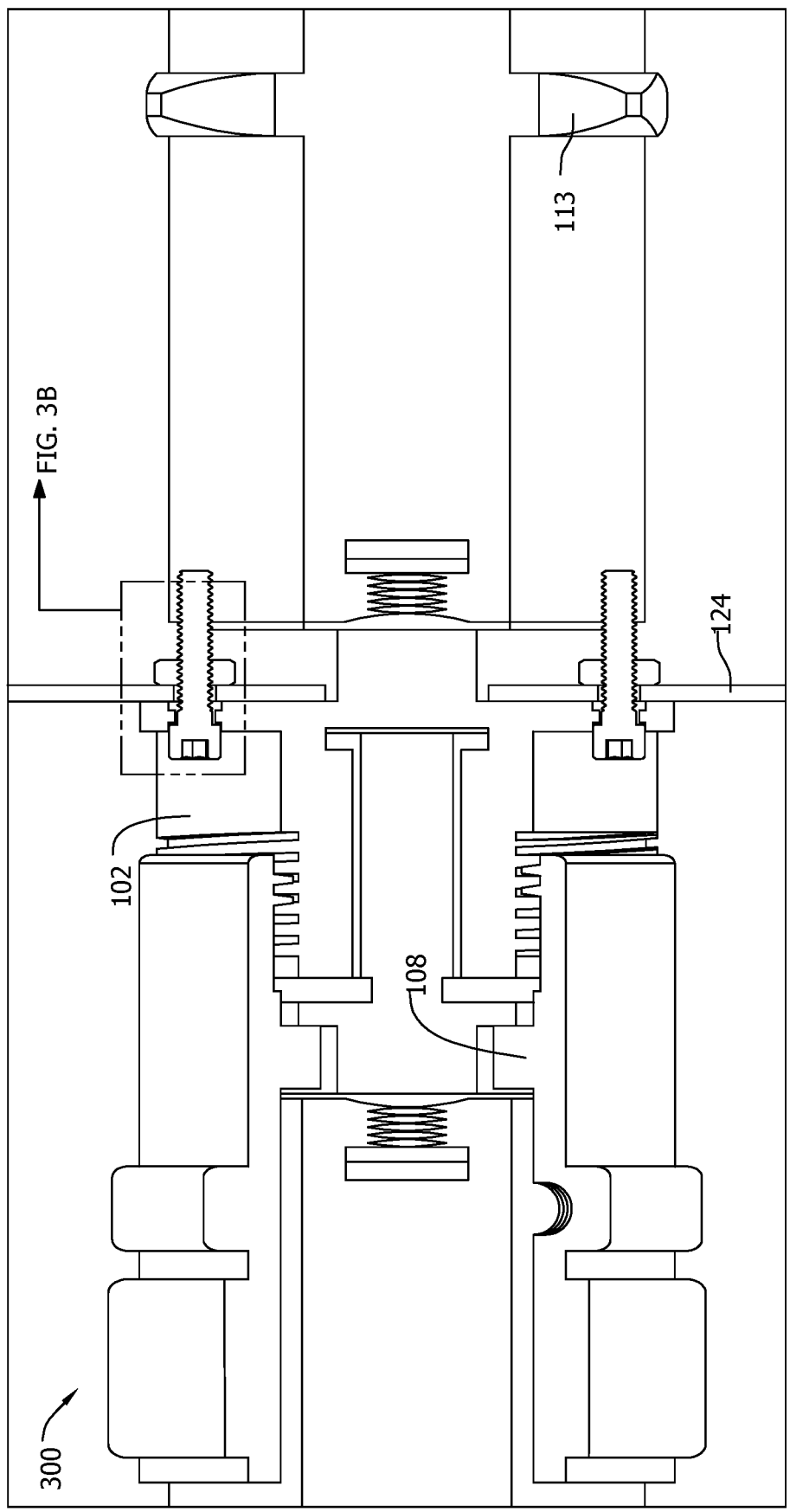
FIG. 3A is a side view of a known connector assembly.
Figure 3B:
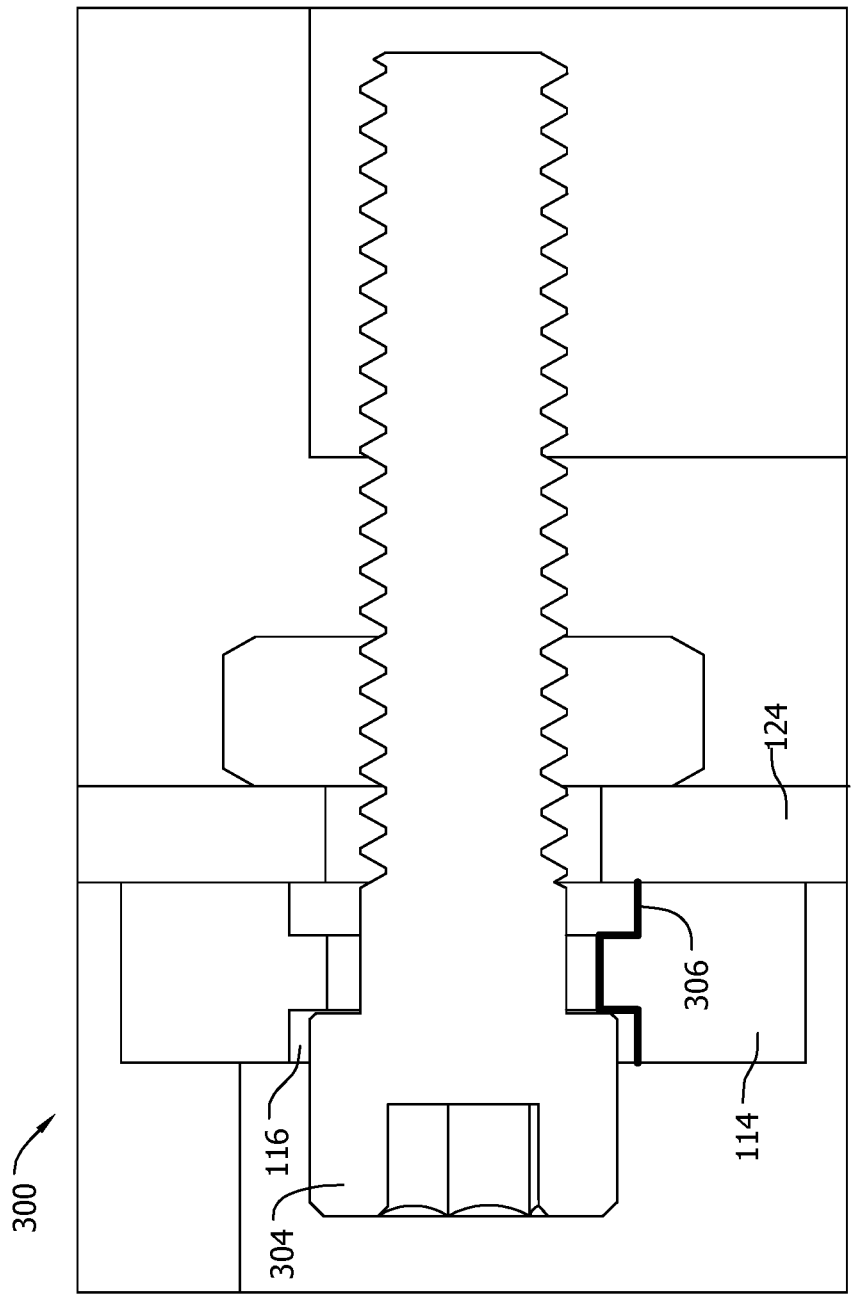
FIG. 3B is an enlarged view of the connector assembly shown in FIG. 3A.

FIGS. 3A and 3B show a similar connector assembly 300, where FIG. 3B is an enlarged section of FIG. 3A along section line FIG. 3B. Different from connector assembly 100, connector assembly 300 does not include bushing 106, and a fastener 304 of connector assembly 300 is made of electrically-conductive material such as metal. Fastener 304 has a larger dimension than fastener 104 in order for it to be fitted into the same mounting shell 102 of the assembly 100 described above. In addition to attaching the mounting shell 102 to support 124, the fastener 304 by design provides an electrical grounding path in the completed connector assembly 300. To ensure that the ground path is established in the assembly 300 anodization on the exposed metal of the mounting shell connector 102 is partly removed, specifically along aperture 116 of flange 114 (marked by a line 306) such that mounting shell connector 102 is electrically connected to support 124 (FIG. 3B) through the fastener. As a result, when support 124 is grounded, connector assembly 300 is also grounded through the electrical connection between fastener 304 and flange 114.

In some applications such as variable frequency drive (VFD) motors, however, support 124 is not desirable to carry the same ground path as the VFD power supply shield. A support 124 with the same ground path may create electrical interference and noise in the electrical control signals delivered through the connector assembly. In such applications, an individual ground path is desirable to be provided from one of the cable to the other. That is, in this particular application, flange 114 is grounded, while support 124 is desirable to be grounded separately. To solve this problem, instead of redesigning the entire connector assembly and replacing connectors and cables, bushing 106 is included in connector assembly 100 to defeat the ground connection established in the assembly 300 via the fastener when desired for applications such as cabling to VFD motors or for other control or instrumentation purposes.

Figure 4:
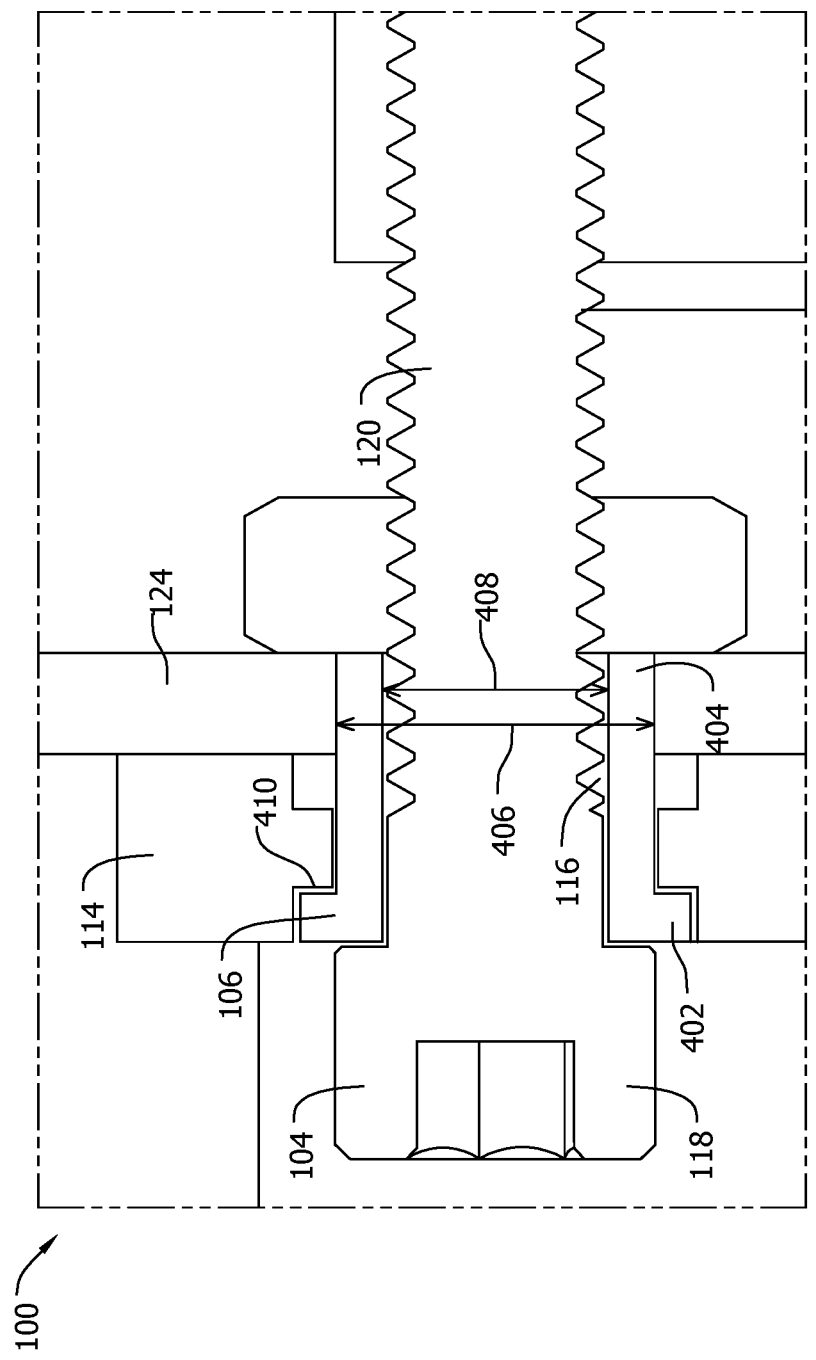
FIG. 4 is an enlarged view of the exemplary connector assembly shown in FIG. 1.
Figure 5:
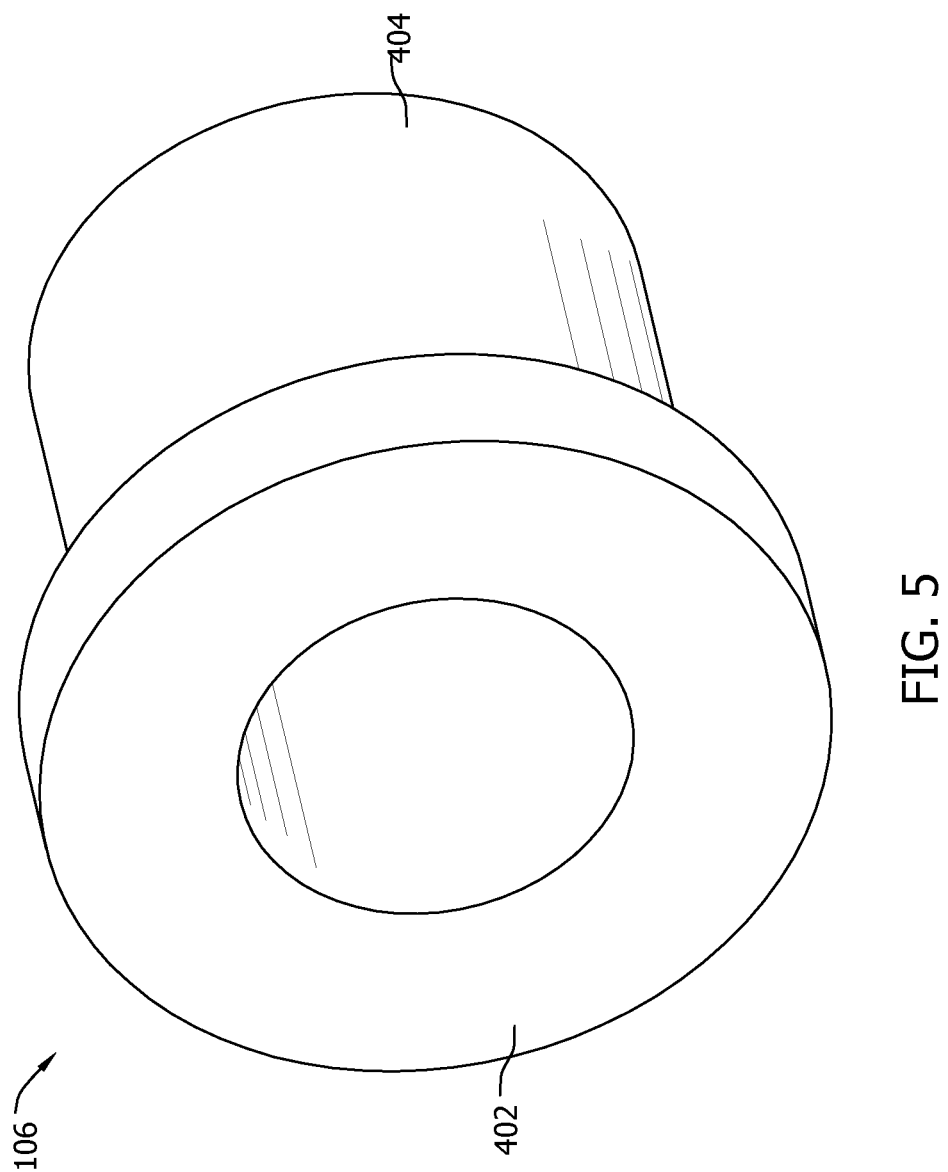
FIG. 5 is a perspective view of an exemplary bushing used in the connector assembly shown in FIG. 1

FIG. 4 is an enlarged view of connector assembly 100 shown in FIG. 1 along section line FIG. 4, and FIG. 5 is a perspective view of bushing 106. In the exemplary embodiment, bushing 106 includes a hollow bushing body 404. Bushing 106 may further include a bushing head 402. Bushing head 402 may extend outwardly from bushing body 404. Bushing 106 may form a T-like shape. An outer dimension 406 of bushing body 404 is sized to be received in aperture 116 of flange 114 (FIG. 4). An inner dimension 408 of bushing body 404 is sized to receive a part of fastener 104 such as the threaded body 120 of a screw fastener 104. In one example, outer dimension 406 is 5/16 in. (0.79 cm) and inner dimension 408 is 3/16 in. (0.48 cm). Bushing 106 is fabricated from an electrically-nonconductive material, such as rubber, plastic, nylon, or any other material that enables bushing 106 to function as described herein. Bushing 106 may be molded or machined. It may be manufactured as one piece or assembled from separate pieces f.

Fastener 104 has a different size from fastener 304 for it to be fitted with the same first connector 102. Fastener 104, bushing 106, and fastener 304 may therefore be provided as part of a kit to customers who may use the connector assembly 100 with or without the integral ground path in the connector assembly via use or non-use of the bushing 106 with the selected fastener. Customization and expense of designing an all new connector system for VFS motor applications or other applications wherein the integral ground paths through the fasteners is not desired is therefore obviated while allowing customers to more universally use the connector assembly in different end uses via simple choices in whether to use the large conductive fasteners in the mounting arrangements or whether to use the smaller fasteners and bushings to complete the mounting of the connector assembly.

In use, each bushing 106 is disposed in aperture 116 with bushing body 404 passing through an aperture 116 in the mounting flange 114 and with bushing head 402 placed along an edge 410 of aperture 116 to limit the bushing 106 from being inserted too far into aperture 116. Fasteners 104 are inserted through bushing body 404 and clamped with the nut 122. As a result, the ground path connection between flange 114 and fastener 104 is broken by nonconductive bushing 106. In other words, the fasteners 104 are electrically isolated from the mounting flange 114 by virtue of the bushings 106. Outer dimension 406 and inner dimension 408 of bushing 106 are sized such that bushing 106 is held in place through its friction with flange 114 and fastener 104.

A variety of heavy duty coaxial plug and receptacle connectors that may be used with the mounting shell as shown and described herein that may benefit from similar isolation of the mounting shell from otherwise desirable ground paths in certain uses of the connectors and cabling. Specifically, heavy duty connectors such as medium voltage Quik-Loc™ plugs and receptacles, Roughneck™ heavy duty control and instrumentation connectors, or Rounds™ plugs and receptacles for power and control applications of the Crouse-Hinds Series of Eaton Corporation (www.eaton.com) may benefit from a similar isolation of ground path in the mounting shell as shown and described above.

Heavy-duty plug and receptacle connectors, like the connector mounting shell described herein are designed and certified for use in a harsh environment, and may be rated for service in a power system operating at, for example only, 500 Volts to 1750 Volts AC, 500 Volts to 175 Volts DC, and DC amperage ratings from 75 to 500 Amps depending on corresponding cable capacity in a variety of different harsh environment industrial facilities. Of course, higher and lower ratings are possible in various contemplated embodiments of the connector assemblies disclosed herein.

Bushing 106 may be used on the connector types described above, as well as with other types of connectors for hazardous and harsh industrial use to isolate an otherwise desirable ground in a connector assembly by preventing electrical connection between the connector and the support or another connector to which the first connector mounts or connects. The dimensions and placement of bushing 106 may vary such that bushing 106 can be fitted with connectors of different dimensions and types, with insubstantial differences from the description provided herein.

Figure 6:
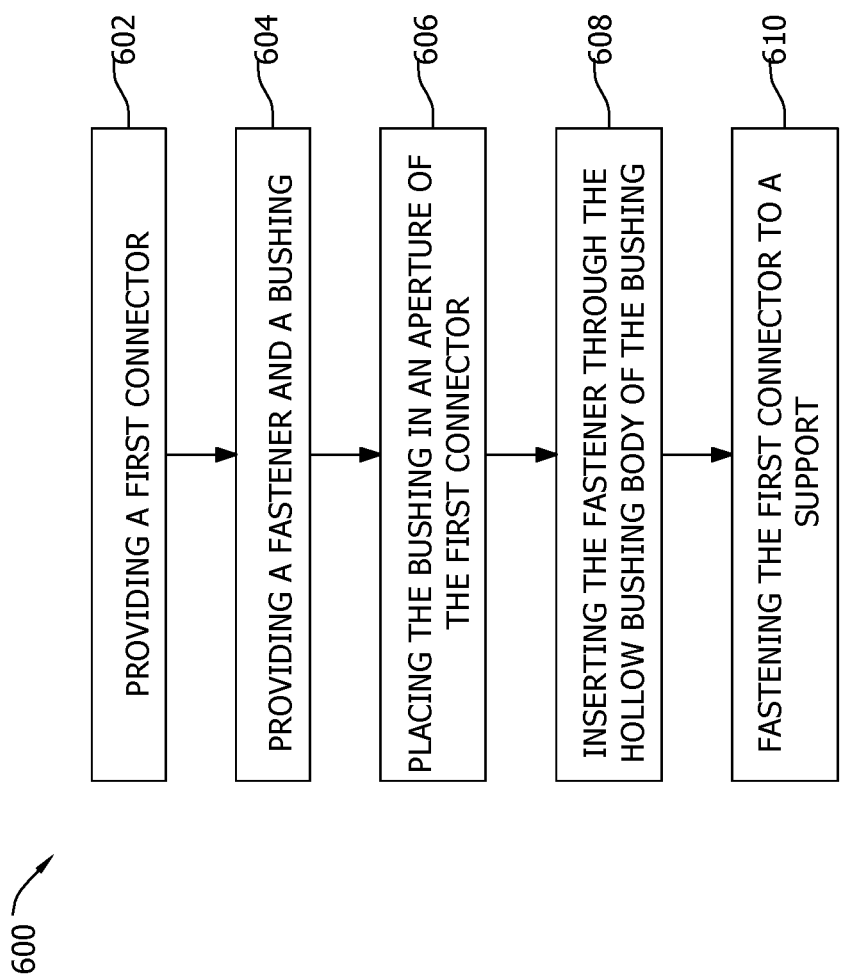
FIG. 6 is a flow chart illustrating an exemplary method of assembling the connector assembly shown in FIGS. 1, 2, 4, and 5.

FIG. 6 shows an exemplary method 600 of assembling an electrical connector assembly. The connector assembly may include any of the examples or embodiments described above. Method 600 includes providing 602 a first connector. The first connector includes a flange having a plurality of apertures. Method 600 further includes providing 604 a fastener and an electrically-nonconductive bushing. The bushing includes a hollow bushing body. Method 600 also includes placing 606 the bushing in one of the apertures of the first connector. Further, method 600 includes inserting 608 the fastener through the hollow bushing body of the bushing. In addition, method 600 includes fastening 610 the first connector to a support.

Various embodiments of connector assemblies are described herein including a nonconductive bushing, thereby isolating electrical connection between the connector assembly and a support to which the connector assembly is mounted. Further, existing systems can be used in applications of different grounding needs, thereby avoiding custom redesign of electrical systems for different applications. While exemplary embodiments of components, assemblies and systems are described, variations of the components, assemblies and systems are possible to achieve similar advantages and effects. Specifically, the shape and the geometry of the components and assemblies, and the relative locations of the components in the assembly, may be varied from that described and depicted without departing from inventive concepts described. Also, in certain embodiments certain components in the assemblies described may be omitted to accommodate particular types of connectors and supports, or the needs of particular installations, while still providing cost effective connector assemblies for electrical wiring or cabling.

The benefits and advantages of the inventive concepts are now believed to have been amply illustrated in relation to the exemplary embodiments disclosed.

An embodiment of a heavy-duty, harsh environment coaxial connector assembly has been disclosed including a mounting shell connector having a cylindrical body and an electrically conductive mounting flange extending from the cylindrical body, a plurality of mounting apertures formed in the flange to support the mounting shell connector via a plurality of fasteners extending through the respective mounting apertures, an wherein each of the plurality of fasteners is electrically isolated from the mounting flange.

Optionally the plurality of fasteners may electrically conductive. A nonconductive bushing may be associated with each fastener, each nonconductive bushing electrically isolating one of the plurality of fasteners from the mounting flange. At least one of the nonconductive bushings may have a T-shape. A nut may be attached to each respective fastener and secure the respective nonconductive bushing to the mounting flange.

As further options, the mounting shell connector may be fabricated from metal, and at least a portion of the mounting shell connector may anodized. The mounting shell connector may include a threaded outer surface, and the connector assembly may further include a cable connector having an inner threaded surface to mate with the threaded outer surface of the mounting shell connector. The cable connector may include a polygonal surface to receive an application of torque to complete a threaded engagement of the mounting shell connector and the second electrical connector. The cylindrical body of the mounting shell connector may have a round outer surface, while the mounting flange may rectangular.

As embodiment of a heavy-duty, harsh environment coaxial connector assembly has likewise been disclosed including a mounting shell connector including an electrically conductive mounting flange and a cylindrical body extending from a first side of the mounting flange and a connector portion extending an a second side of the mounting flange, a plurality of mounting apertures formed in the mounting flange to support the mounting shell connector via a plurality of fasteners extending through the respective plurality of mounting apertures, and a respective plurality of electrically nonconductive bushings each electrically isolating a respective one of the fasteners from the mounting flange.

Optionally, the mounting shell connector may be fabricated from metal. At least a portion of the mounting shell connector may be anodized. At least one of the nonconductive bushings may have a T-shape. A nut may be attached to each respective fastener and securing the respective nonconductive bushing to the mounting flange. The mounting shell connector may include a threaded outer surface, the connector assembly of may further include a cable connector having an inner threaded surface to mate with the threaded outer surface of the mounting shell connector. The cable connector may include a polygonal surface to receive an application of torque to complete a threaded engagement of the mounting shell connector and the cable connector.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A heavy-duty, harsh environment coaxial connector assembly, comprising:
   a mounting shell connector including a cylindrical body and an electrically conductive mounting flange extending from the cylindrical body;
   a plurality of mounting apertures formed in the mounting flange to support the mounting shell connector via a plurality of fasteners extending through the respective mounting apertures; and
   wherein each of the plurality of fasteners is electrically isolated from the mounting flange, wherein a ground path connection between the mounting flange and the plurality of fasteners is broken by a nonconductive bushing.

2. The connector assembly of claim 1, wherein the plurality of fasteners are electrically conductive.

3. The connector assembly of claim 2, wherein the nonconductive bushing electrically isolates one of the plurality of fasteners from the mounting flange.

4. The connector assembly of claim 3, wherein at least one of the nonconductive bushings has a T-shape.

5. The connector assembly of claim 3, further comprising a nut attached to each respective fastener and securing the respective nonconductive bushing to the mounting flange.

6. The connector assembly of claim 1, wherein the mounting shell connector is fabricated from metal.

7. The connector assembly of claim 6, wherein at least a portion of the mounting shell connector is anodized.

8. The connector assembly of claim 1, wherein the mounting shell connector includes a threaded outer surface.

9. The connector assembly of claim 8, further comprising a cable connector having an inner threaded surface to mate with the threaded outer surface of the mounting shell connector.

10. The connector assembly of claim 9, wherein the cable connector includes a polygonal surface to receive an application of torque to complete a threaded engagement of the mounting shell connector and the cable connector.

11. The connector assembly of claim 1, wherein the cylindrical body has a round outer surface.

12. The connector assembly of claim 11, wherein the mounting flange is rectangular.

13. A heavy-duty, harsh environment coaxial connector assembly, comprising:
    a mounting shell connector including an electrically conductive mounting flange and a cylindrical body extending from a first side of the mounting flange and a connector portion extending a second side of the mounting flange;
    a plurality of mounting apertures formed in the mounting flange to support the mounting shell connector via a plurality of fasteners extending through the respective plurality of mounting apertures; and
    a respective plurality of electrically nonconductive bushings each electrically isolating a respective one of the fasteners from the mounting flange, wherein a ground path connection between the mounting flange and a respective one of the fasteners is broken by one of the respective plurality of electrically nonconductive bushings.

14. The connector assembly of claim 13, wherein the mounting shell connector is fabricated from metal.

15. The connector assembly of claim 14, wherein at least a portion of the mounting shell connector is anodized.

16. The connector assembly of claim 13, wherein at least one of the nonconductive bushings has a T-shape.

17. The connector assembly of claim 13, further comprising a nut attached to each respective fastener and securing the respective nonconductive bushing to the mounting flange.

18. The connector assembly of claim 13, wherein the mounting shell connector includes a threaded outer surface.

19. The connector assembly of claim 18, further comprising a cable connector having an inner threaded surface to mate with the threaded outer surface of the mounting shell connector.

20. The connector assembly of claim 19, wherein the cable connector includes a polygonal surface to receive an application of torque to complete a threaded engagement of the mounting shell connector and the cable connector.

* * * * *